United States Patent
Lee et al.

(10) Patent No.: US 10,133,112 B2
(45) Date of Patent: Nov. 20, 2018

(54) LIQUID CRYSTAL DISPLAY

(71) Applicant: SAMSUNG DISPLAY CO., LTD., Yongin-si, Gyeonggi-do (KR)

(72) Inventors: Yun-Gun Lee, Asan-si (KR); Min Wook Park, Asan-si (KR)

(73) Assignee: Samsung Display Co., Ltd. (KR)

( * ) Notice: Subject to any disclaimer, the term of this patent is extended or adjusted under 35 U.S.C. 154(b) by 195 days.

(21) Appl. No.: 15/081,772

(22) Filed: Mar. 25, 2016

(65) Prior Publication Data

US 2016/0320679 A1    Nov. 3, 2016

(30) Foreign Application Priority Data

Apr. 29, 2015    (KR) .................. 10-2015-0060542

(51) Int. Cl.
  *G02F 1/1333*    (2006.01)
  *G02F 1/1335*    (2006.01)
  *G02F 1/1362*    (2006.01)
  *G02F 1/1343*    (2006.01)

(52) U.S. Cl.
  CPC .... *G02F 1/133512* (2013.01); *G02F 1/13624* (2013.01); *G02F 1/134309* (2013.01); *G02F 2001/134345* (2013.01)

(58) Field of Classification Search
  CPC ........... G02F 1/13624; G02F 1/134309; G02F 1/133512; G02F 2001/134345; G02F 1/1333; G02F 1/136209; G02F 1/134336; G02F 1/133753
  USPC .......................................................... 349/43
  See application file for complete search history.

(56) References Cited

U.S. PATENT DOCUMENTS

| 7,834,962 | B2 | 11/2010 | Satake et al. |
| 9,019,453 | B2* | 4/2015 | Rho .................. G02F 1/134309 349/123 |
| 9,567,527 | B2* | 2/2017 | Lim .................. G02F 1/133788 |
| 2009/0122223 | A1 | 5/2009 | Hayano et al. |
| 2011/0019142 | A1* | 1/2011 | Inoue ................ G02F 1/134309 349/139 |
| 2011/0051057 | A1* | 3/2011 | Song ..................... G02F 1/1393 349/106 |
| 2013/0194525 | A1* | 8/2013 | Lee .................... G02F 1/133711 349/43 |

(Continued)

FOREIGN PATENT DOCUMENTS

| KR | 10-2009-0067089 A | 6/2009 |
| KR | 10-2014-0025220 A | 3/2014 |

*Primary Examiner* — Hoan C Nguyen
(74) *Attorney, Agent, or Firm* — Innovation Counsel LLP

(57) ABSTRACT

A liquid crystal display having a curved structure includes a plurality of pixels and a liquid crystal layer interposed between a first display substrate and a second display substrate. The first display substrate includes a first substrate, gate lines, data lines, a first subpixel electrode and a second subpixel electrode disposed in a pixel area, a first thin film transistor, and a second thin film transistor. The second display substrate includes a second substrate, a light blocking member, and a common electrode. Each pixel has a quadrangular shape including a long side and a short side. The long side of each pixel is extended in a first direction that is parallel to a direction in which the liquid crystal display is bent, and the short side of each pixel is extended in a second direction that is vertical to the first direction.

13 Claims, 7 Drawing Sheets

(56) References Cited

U.S. PATENT DOCUMENTS

2015/0036073 A1* 2/2015 Im .................... G02F 1/1333
349/48
2015/0092138 A1* 4/2015 Kwak ............... G02F 1/133512
349/85

* cited by examiner

LIQUID CRYSTAL DISPLAY

CROSS-REFERENCE TO RELATED APPLICATION

This application claims priority to and the benefit of Korean Patent Application No. 10-2015-0060542 filed in the Korean Intellectual Property Office on Apr. 29, 2015, the disclosure of which is incorporated herein by reference in its entirety.

BACKGROUND (a) Technical Field

The present disclosure relates to a liquid crystal display.

(b) Description of the Related Art

A liquid crystal display is one of the most common types of flat panel displays currently in use, and includes two display substrates with field generating electrodes, such as a pixel electrode and a common electrode, and a liquid crystal layer interposed between the two display substrates. The liquid crystal display generates an electric field in the liquid crystal layer by applying a voltage to the field generating electrodes, changes a direction of liquid crystal molecules of the liquid crystal layer, and controls polarization of incident light through the generated electric field to display an image.

Among the liquid crystal displays, a vertically aligned (VA) mode liquid crystal display has a liquid crystal layer including liquid crystal molecules. The long axes of liquid crystal molecules are aligned to be vertical to display substrates while electric fields are not applied. The VA mode liquid crystal display came into the spotlight due to a large contrast ratio and a wide reference viewing angle. For example, the reference viewing angle refers to a viewing angle where a contrast ratio is 1:10 or a luminance reverse critical angle is between gray values.

For the VA mode liquid crystal display, a method of dividing one pixel into two subpixels and reducing a voltage of any one pixel to differentiate voltages of two subpixels to differentiate the transmittances of the two subpixels is proposed so that side visibility is close to front side visibility. However, when the liquid crystal display is applied to a curved display device, an aperture ratio may be decreased due to misalignment.

The above information disclosed in this Background section is only for enhancement of understanding of the background information of the present disclosure, and therefore it may contain information that does not form a prior art that is known to a person of ordinary skill in the art.

SUMMARY

The present disclosure provides a liquid crystal display having a curved structure, in which an aperture ratio is maintained.

An exemplary embodiment of the present disclosure provides a liquid crystal display having a curved structure, including: a plurality of pixels arranged in a matrix form; a first display substrate and a second display substrate that face each other; and a liquid crystal layer interposed between the first display substrate and the second display substrate, in which the first display substrate includes: a first substrate; gate lines disposed on the first substrate; data lines intersecting with the gate lines; a first subpixel electrode and a second subpixel electrode disposed in a pixel area; a first thin film transistor connected to each of the gate lines and the data lines, and the first subpixel electrode; and a second thin film transistor connected to each of the gate lines and the data lines, and the second subpixel electrode, and the second display substrate includes: a second substrate facing the first substrate; a light blocking member disposed on the second substrate; and a common electrode disposed on the light blocking member. Each pixel has a quadrangular shape including a long side extended in a first direction that is parallel to a direction in which the liquid crystal display is bent and a short side that is extended in a second direction that is vertical to the first direction. The light blocking member includes a plurality of openings exposing a portion of the first subpixel electrode and the second subpixel electrode according to a plane. Each opening has a quadrangular shape including a long side extended in the second direction and a short side extended in the first direction.

The gate line may be extended in the second direction and cross a center portion of each pixel.

The data line may be extended in the first direction.

The liquid crystal display may further include a step-down voltage line disposed on the first substrate, separated from the gate line, and extended in the second direction.

A first voltage applied to the step-down voltage line may be lower than a second voltage applied to the data line.

The liquid crystal display may further include a third thin film transistor connected to the gate line, the step-down voltage line, and the second subpixel electrode.

Each of the first subpixel electrode and the second subpixel electrode may include a plate-shaped portion and a plurality of branch electrodes extended from the plate-shaped portion in four different directions.

The common electrode may include a cross-shaped cutout overlapping the plate portion.

Each of the first subpixel electrode and the second subpixel electrode may be divided into a plurality of subareas by the plate-shaped portion and the plurality of branch electrodes.

The subarea of each of the first subpixel electrode and the second subpixel electrode may be divided into four areas by the cutout and the plurality of branch electrodes on a plane.

The light blocking member may include: a horizontal light blocking member overlapping the data line; a vertical light blocking member overlapping the gate line, the first thin film transistor, the second thin film transistor, the third thin film transistor, and the step-down voltage line; and an auxiliary light blocking member parallel to the vertical light blocking member, and connecting adjacent horizontal light blocking members.

Each opening may be formed by the vertical light blocking member, the auxiliary light blocking member, and the horizontal light blocking member.

The auxiliary light blocking member may overlap a boundary portion of the plurality of subareas of the first subpixel electrode and the second subpixel electrode.

The first subpixel electrode and the second subpixel electrode may be disposed at a left side and a right side based on the gate line, respectively.

According to the exemplary embodiment of the present disclosure, the long side of the pixel is extended in the direction parallel to the direction, in which the liquid crystal display is bent, so that it is possible to decrease an overlapping area of the light blocking member and the pixel electrode according to the curve of the liquid crystal display. Accordingly, it is possible to prevent the aperture ratio from being decreased in a curved liquid crystal display.

DETAILED DESCRIPTION OF THE EMBODIMENTS

Figure 1:
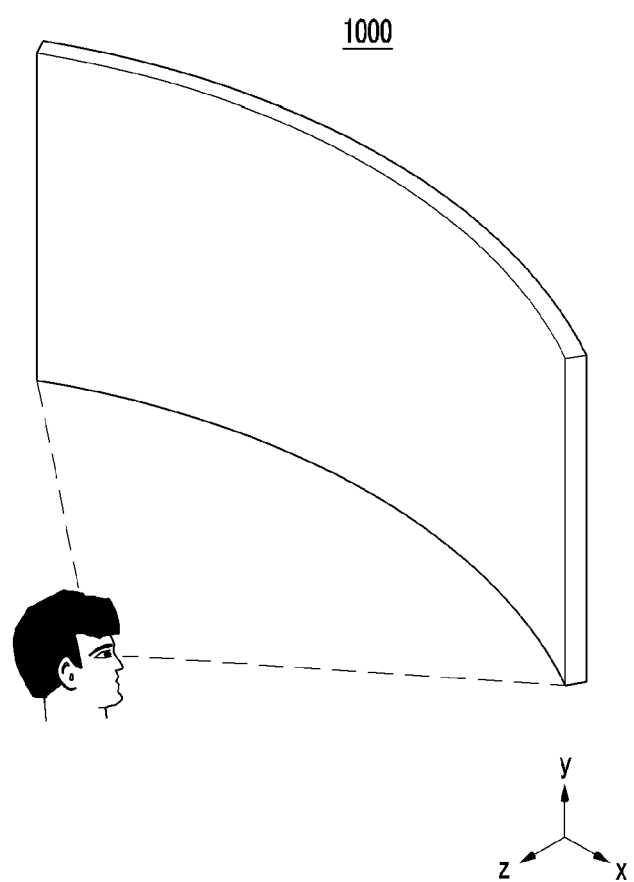
FIG. 1 is a schematic perspective view of a liquid crystal display, according to an exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, without departing from the spirit or scope of the present disclosure.

In describing the present disclosure, parts that are not related to the description may be omitted. Like reference numerals generally designate like elements throughout the specification. In addition, the size and thickness of each configuration shown in the drawings are arbitrarily shown for understanding and ease of description, but the present disclosure is not limited thereto.

In the drawings, the thickness of layers, films, panels, regions, etc., may be exaggerated for clarity. In the drawings, for convenience of the description, thicknesses of some layers and areas may be exaggerated. It will be understood that when an element such as a layer, film, region, or substrate is referred to as being "on" another element, it can be directly on the another element or one or more intervening elements may also be present.

In addition, unless explicitly described to the contrary, the term "comprise" and its variations such as "comprises" or "comprising", will be understood to imply an inclusion of stated elements but not an exclusion of any other elements. Further, in the specification, the term "on" means positioning on or below an object portion, but does not essentially mean positioning on an upper side of the object portion based on a gravity direction. Further, throughout the specification, the term "according to a plane" or "on a plane" means a case where a target portion is viewed from the above, and the term "according to a cross section" means a case where a cross section taken by cutting a target portion is viewed from a side.

FIG. 1 is a schematic perspective view of a liquid crystal display, according to an exemplary embodiment of the present disclosure. A liquid crystal display 1000 may be a curved liquid crystal display bent in an X-axis direction that is a long axis. In the present exemplary embodiment, a structure, in which the liquid crystal display 1000 is bent in the X-axis direction, is described, but the present disclosure is not limited thereto and may be applied to a flat panel display. The liquid crystal display 1000 includes a plurality of pixels displaying an image.

Figure 2:
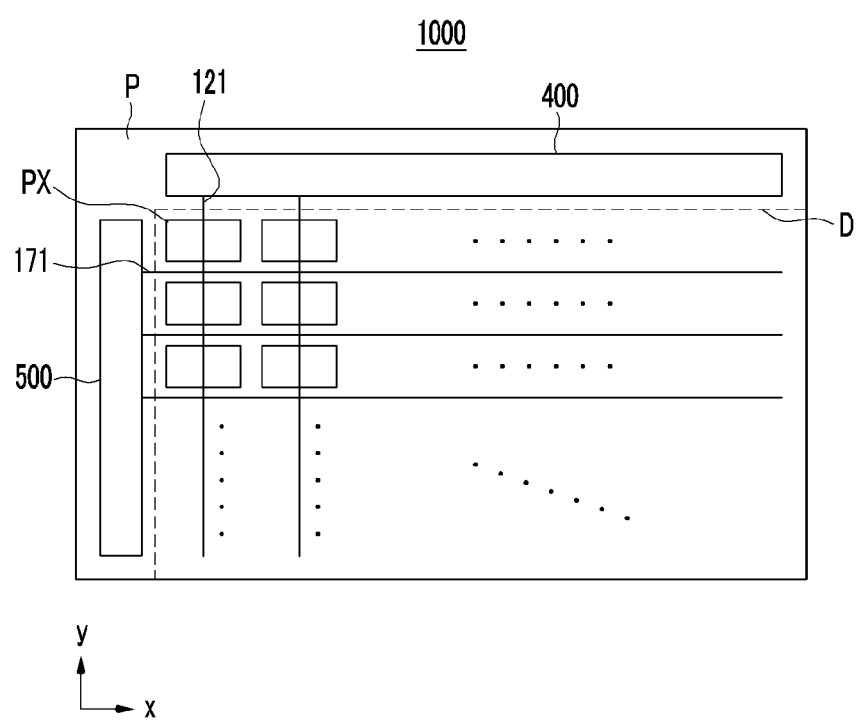
FIG. 2 is a block diagram of the liquid crystal display, according to the exemplary embodiment of the present disclosure.

FIG. 2 is a block diagram of the liquid crystal display, according to the exemplary embodiment of the present disclosure. Referring to FIG. 2, the liquid crystal display 1000, according to the present exemplary embodiment, includes a display area D, in which an image is displayed, and a peripheral area P positioned around the display area D. A plurality of gate lines 121, a plurality of data lines 171, and a plurality of pixels PX are arranged in a matrix form and disposed in the display area D.

Each pixel PX has a quadrangular shape having a pair of long sides and a pair of short sides. The long side of each pixel PX is extended in the X-axis direction, and the short side of each pixel PX is extended in a Y-axis direction. That is, the long side of each pixel PX is extended parallel to the direction in which the liquid crystal display 1000 is bent, and the short side of each pixel PX is vertically extended to the direction in which the liquid crystal display 1000 is bent.

Each gate line 121 transmits a gate signal to each pixel PX, and is extended in the Y-axis direction in which the short side of each pixel PX is extended. Each gate line 121 may cross a center portion of each pixel PX. Each data line 171 transmits a data signal to each pixel PX, and is extended in the X-axis direction in which the long side of each pixel PX is extended.

A gate driver 400 and a data driver 500 are disposed in the peripheral area P. For example, the gate driver 400 is disposed at an upper side of the display area D, and the data driver 500 is disposed at the left side of the display area D. According to some embodiments, two or more gate drivers 400 and data drivers 500 may be disposed.

Figure 3:
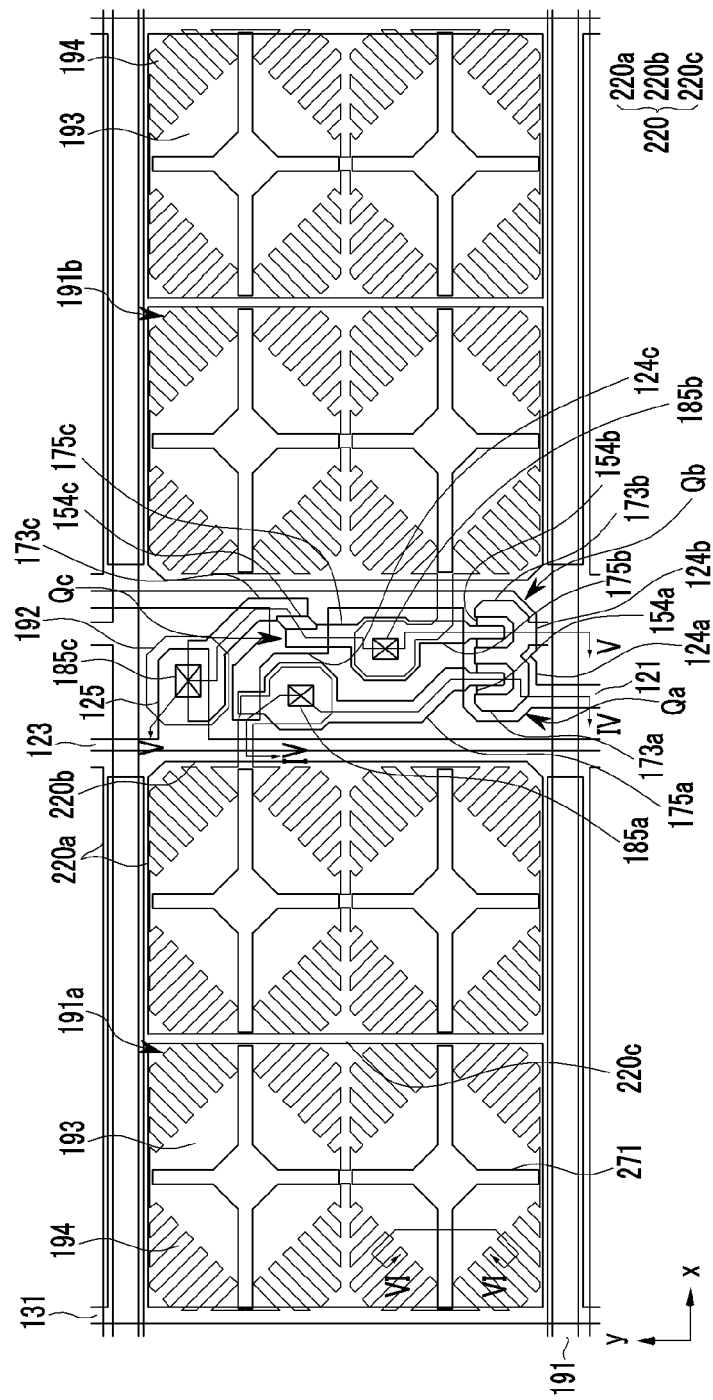
FIG. 3 is a top plan view illustrating one pixel of the liquid crystal display, according to the exemplary embodiment of the present disclosure.
Figure 4:
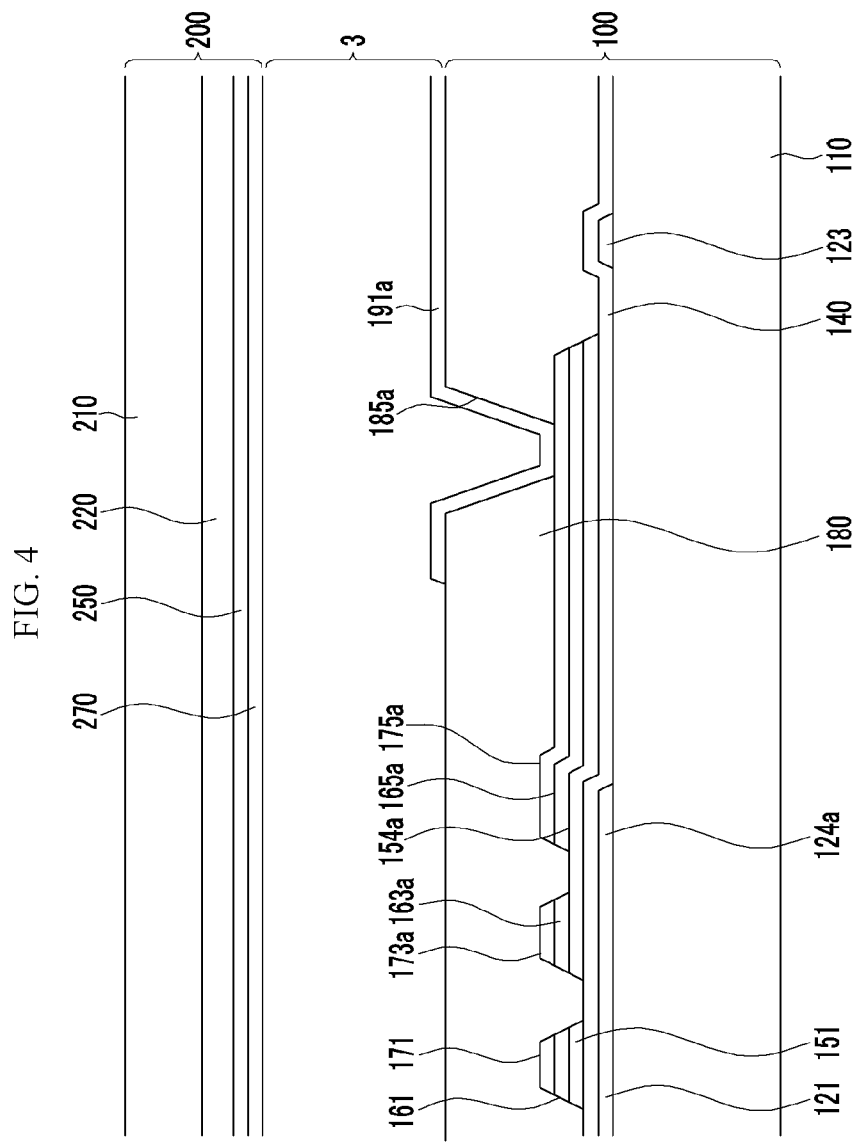
FIG. 4 is a diagram illustrating one example of a cross-section taken along line IV-IV of FIG. 3.
Figure 5:
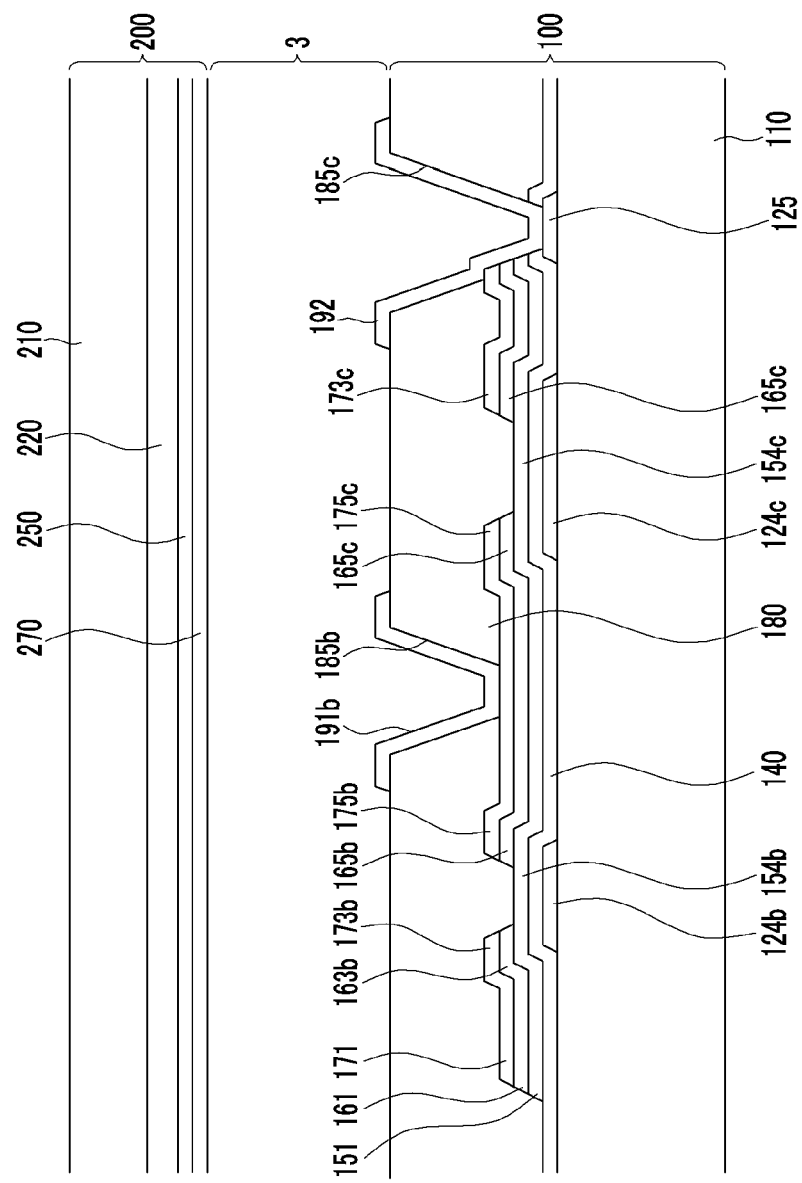
FIG. 5 is a diagram illustrating one example of a cross-section taken along line V-V of FIG. 3.
Figure 6:
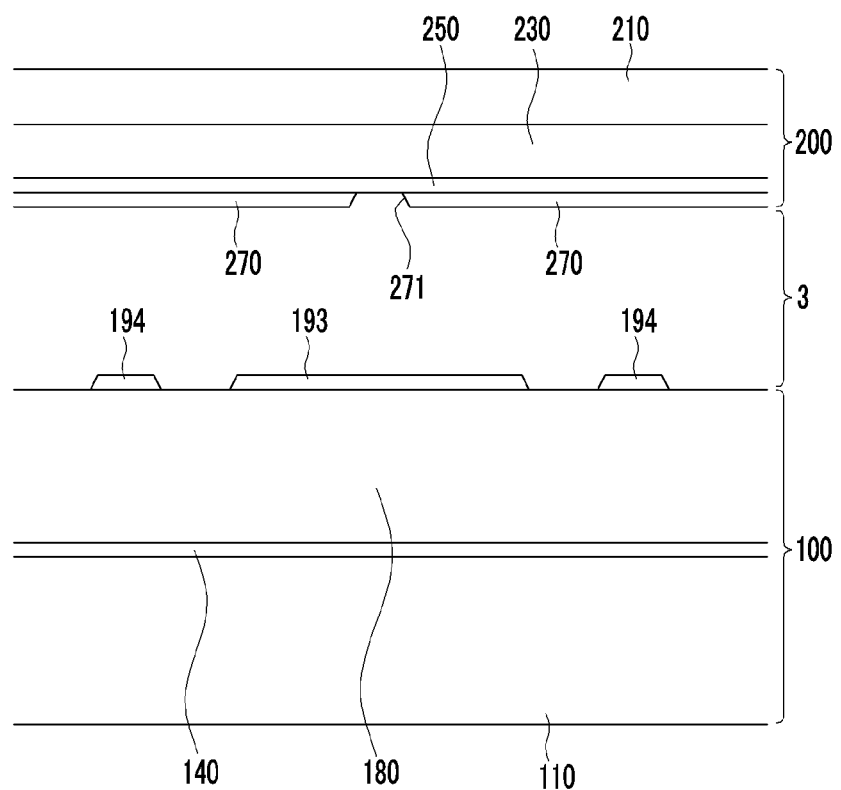
FIG. 6 is a diagram illustrating one example of a cross-section taken along line VI-VI of FIG. 3.
Figure 7:
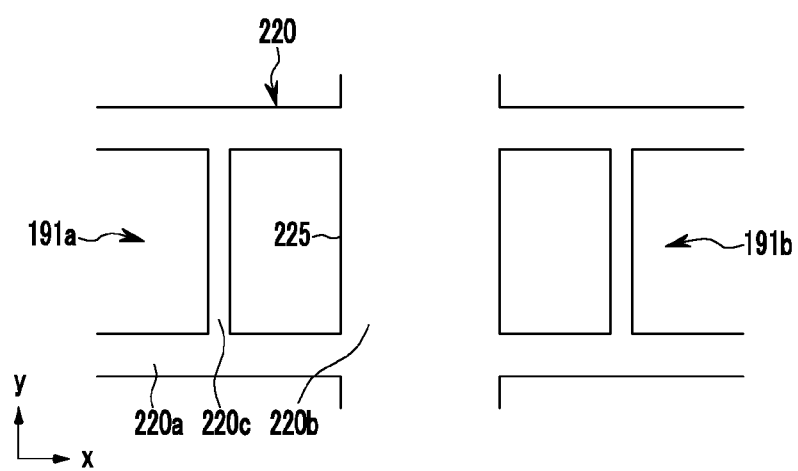
FIG. 7 is a diagram schematically illustrating a top plan surface on which a light blocking member of the liquid crystal display, according to the exemplary embodiment of the present disclosure.

A structure of the liquid crystal display, according to the exemplary embodiment of the present disclosure, will be described with reference to FIGS. 3 to 7. FIG. 3 is a top plan view illustrating one pixel of the liquid crystal display, according to the exemplary embodiment of the present disclosure. FIG. 4 is a diagram illustrating one example of a cross-section taken along line IV-IV of FIG. 3. FIG. 5 is a diagram illustrating one example of a cross-section taken along line V-V of FIG. 3. FIG. 6 is a diagram illustrating one example of a cross-section taken along line VI-VI of FIG. 3. FIG. 7 is a diagram schematically illustrating a top plan surface on which a light blocking member of the liquid crystal display, according to the exemplary embodiment of the present disclosure.

The liquid crystal display, according to the present exemplary embodiment, includes a first display substrate 100 and a second display substrate 200 that face each other, and a liquid crystal layer 3 interposed between the first and second display substrates 100 and 200.

First, the first display substrate 100 will be described. Gate conductors including a gate line 121 and a step-down voltage line 123, and a storage electrode line 131 are disposed on an insulating substrate 110. The insulating substrate 110 may be formed of transparent glass, plastics, or the like. The gate line 121 is extended in the Y-axis direction, transmits a gate signal (also referred to as "a scan signal"), and includes a first gate electrode 124a, a second gate electrode 124b, and a third gate electrode 124c. The step-down voltage line 123 is extended in the Y-axis direction, and includes an expanded portion 125 extended in the X-axis direction. The step-down voltage line 123 is separated from the gate line 121, and is extended parallel to the gate line 121. Further, a relatively lower voltage than a data voltage applied to the data line 171, which is to be described below, is applied to the step-down voltage line 123. The storage electrode line 131 is extended in the Y-axis direction, and includes a protrusion extended in the X-axis direction.

A gate insulating layer 140 is formed on the gate conductors 121, 123, and 131. A semiconductor layer 151 is disposed on the gate insulating layer 140. The semiconductor layer 151 includes a first semiconductor layer 154a, a second semiconductor layer 154b, and a third semiconductor layer 154c. The first semiconductor layer 154a overlaps the first gate electrode 124a, and the second semiconductor layer 154b overlaps the second gate electrode 124b. Further, the third semiconductor layer 154c overlaps the third gate electrode 124c. The first and second semiconductor layers 154a and 154b are connected to each other, and the third semiconductor layer 154c is connected with the second semiconductor layer 154b.

An ohmic contact 161 is disposed on the semiconductor layer 151. The ohmic contact 161 includes first ohmic contacts 163a and 165a, second ohmic contacts 163b and 165b, and third ohmic contacts 163c and 165c. The first ohmic contacts 163a and 165a are disposed on the first semiconductor layer 154a. The second ohmic contacts 163b and 165b are disposed on the second semiconductor layer 154b. Further, the third ohmic contacts 163c and 165c are disposed on the third semiconductor layer 154c. When the semiconductor layer 151 includes an oxide semiconductor, the ohmic contact 161 may be omitted.

The data line 171 includes a first source electrode 173a and a second source electrode 173b. Data conductors including the data line 171, a third source electrode 173c, a first drain electrode 175a, a second drain electrode 175b, and a third drain electrode 175c are disposed on the ohmic contact 161. The second drain electrode 175b and the third drain electrode 175c are connected to each other.

The data line 171 is extended in the X-axis direction, and transmits the data signal. The data line 171 may overlap the protrusion of the storage electrode line 131. The first source electrode 173a and the first drain electrode 175a are disposed on the first ohmic contacts 163a and 165a. The second source electrode 173b and the second drain electrode 175b are disposed on the second ohmic contacts 163b and 165b. Further, the third source electrode 173c and the third drain electrode 175c are disposed on the third ohmic contacts 163c and 165c.

The first gate electrode 124a, the first source electrode 173a, and the first drain electrode 175a form a first thin film transistor Qa together with the first semiconductor layer 154a. The second gate electrode 124b, the second source electrode 173b, and the second drain electrode 175b form a second thin film transistor Qb together with the second semiconductor layer 154b. Further, the third gate electrode 124c, the third source electrode 173c, and the third drain electrode 175c form a third thin film transistor Qc together with the third semiconductor layer 154c.

A passivation layer 180 is disposed on the data conductors 171, 173a, 173b, 173c, 175a, 175b, and 175c. The passivation layer 180 may include an inorganic insulating material or an organic insulating material. A first contact hole 185a, through which a part of the first drain electrode 175a is exposed, and a second contact hole 185b, through which a part of the second drain electrode 175b is exposed, are formed in the passivation layer 180. Further, a third contact hole 185c, through which a part of the expanded portion 125 of the step-down voltage line 123 and a part of the third source electrode 173c are exposed together, is formed in the passivation layer 180 and the gate insulating layer 140.

A first subpixel electrode 191a, a second subpixel electrode 191b, and a connecting member 192 are disposed on the passivation layer 180. The first subpixel electrode 191a is physically and electrically connected with the first drain electrode 175a through the first contact hole 185a to receive a data voltage from the first drain electrode 175a. The second subpixel electrode 191b is physically and electrically connected with the second drain electrode 175b through the second contact hole 185b to receive a data voltage from the second drain electrode 175b.

The first subpixel electrode 191a and the second subpixel electrode 191b are separated from each other with the gate line 121 that is interposed between the first subpixel electrode 191a and the second subpixel electrode 191b to be positioned at a left side and a right side of a pixel area based on the gate line 121. That is, the first subpixel electrode 191a and the second subpixel electrode 191b are adjacent in the Y-axis direction. One pixel of the liquid crystal display, according to the present exemplary embodiment, may be divided into a first subpixel and a second subpixel by the first subpixel electrode 191a and the second subpixel electrode 191b.

Each of the first subpixel electrode 191a and the second subpixel electrode 191b includes a plate-shaped portion 193 having a rhombus shape, and a plurality of branch electrodes 194 extended from the plate-shaped portion 193 in four different directions. The plurality of branch electrodes 194 includes a portion obliquely extended in a right and up direction, a portion obliquely extended in a right and down direction, a portion obliquely extended in a left and up direction, and a portion obliquely extended in a left and down direction. As described above, directions, in which liquid crystal molecules of the liquid crystal layer 3 are inclined are different from each other in the four portions that have different directions of the extension of the plurality of branch electrodes 194. Accordingly, four domains having different inclination directions of the liquid crystal molecules are formed in the liquid crystal layer 3. As described above, when the inclination directions of the liquid crystal molecules are diversified, a reference viewing angle of the liquid crystal display may be increased.

Each of the first subpixel electrode 191a and the second subpixel electrode 191b is divided into a plurality of sub-areas by the plate-shaped portion 193 having a rhombus shape, and the plurality of branch electrodes 194 extended from the plate-shaped portion 193 in four different directions. In one embodiment, an area of the second subpixel electrode 191b may be larger than the area of the first subpixel electrode 191a. However, the sizes, shapes, and forms of the first subpixel electrode 191a and the second subpixel electrode 191b of the liquid crystal display, according to the exemplary embodiment of the present disclosure, are not limited thereto, and the first subpixel electrode 191a and the second subpixel electrode 191b may have various different sizes, shapes, and forms. The connecting member 192 connects the expanded portion 125 of the step-down voltage line 123 and the third source electrode 173c to each other through the third contact hole 185c.

Hereinafter, the second display substrate 200 will be described. A light blocking member 220 is disposed on a second insulating substrate 210. The second insulating substrate 210 may be formed of transparent glass, plastic or the like. The light blocking member 220 is also referred to as a black matrix and prevents light leakage.

The light blocking member 220 includes a horizontal light blocking member 220a overlapping the data line 171, and a vertical light blocking member 220b overlapping the gate line 121, the first thin film transistor Qa, the second thin film transistor Qb, and the third thin film transistor Qc. The horizontal light blocking member 220a is connected with the vertical light blocking member 220b.

The light blocking member 220 disposed in the second display substrate 200 covers the first and second subpixel electrodes 191a and 191b that are disposed on the first display substrate 100 by the curved structure of the liquid crystal display, thereby causing an aperture ratio to be decreased. In the present exemplary embodiment, the long side of each pixel is extended parallel to the direction, in which the liquid crystal display is bent, so that the portions of the first and second subpixel electrodes 191a and 191b covered by the light blocking member 220 are decreased. Accordingly, it is possible to prevent an aperture ratio of a curved liquid crystal display from being decreased.

Further, the light blocking member 220 is parallel to the vertical light blocking member 220b, and includes an auxiliary light blocking member 220c connected to the adjacent horizontal light blocking member 220a. The auxiliary light blocking member 220c overlaps boundary portions of the plurality of subareas divided by the plate-shaped portion 193 having a rhombus shape, and the plurality of branch electrodes 194 extended from the plate-shaped portion 193 in the four different directions. In the boundary portion, a texture defect may be generated, and the auxiliary light blocking member 220c may block the boundary portion.

Further, the light blocking member 220 includes a plurality of openings 225 formed by the horizontal light blocking member 220a, the vertical light blocking member 220b, and the auxiliary light blocking member 220c (see FIG. 7). The opening 225 exposes portions of the first subpixel electrode 191a and the second subpixel electrode 191b when the liquid crystal display is viewed on a plane. Each opening 225 has a quadrangular shape having a pair of long sides and a pair of short sides. The long side of each opening 225 is extended in the Y-axis direction, and the short side of each opening 225 is extended in the X-axis direction. That is, the long side of each opening 225 is vertically extended to the direction, in which the liquid crystal display is bent, and the short side of each opening 225 is extended parallel to the direction, in which the liquid crystal display is bent.

A plurality of color filters 230 is also formed on a second insulating substrate 210. The color filter 230 may be disposed within the opening 225 of the light blocking member 220. Further, the color filter 230 may be disposed on the auxiliary light blocking member 220c.

An overcoat 250 is disposed on the color filter 230. The overcoat 250 prevents the color filter 230 from being lifted and suppresses contamination of the liquid crystal layer 3 by an organic material, such as a solvent, flowing from the color filter 230, thereby preventing a defect, such as an afterimage, that may occur when driving a screen. According to some embodiments, the overcoat 250 may be omitted.

A common electrode 270 is disposed on the overcoat 250. The common electrode 270 includes a plurality of cross-shaped cutouts 271. Each cross-shaped cutouts 271 is disposed at a position corresponding to the subarea of each of the first subpixel electrode 191a and the second subpixel electrode 191b, and includes a vertical cutout parallel to the gate line 121 and a horizontal stem portion parallel to the data line 171. Each cross-shaped cutout 271 overlaps the plate-shaped portions 193 of the first subpixel electrode 191a and the second subpixel electrode 191b.

When viewed the liquid crystal display on a plane, the subarea of each of the first subpixel electrode 191a and the second subpixel electrode 191b is divided into four areas by the cross-shaped cutout 271 of the common electrode 270 and the plurality of branch electrodes 194 of the first subpixel electrode 191a and the second subpixel electrode 191b. The first subpixel electrode 191a and the common electrode 270 form a first liquid crystal capacitor together with the liquid crystal layer 3, and the second subpixel electrode 191b and the common electrode 270 form the second liquid crystal capacitor together with the liquid crystal layer 3.

An electric field is applied to the liquid crystal layer 3 by a voltage applied to the first subpixel electrode 191a and the second subpixel electrode 191b and a common voltage applied to the common electrode 270, and inclination directions of the liquid crystal molecules of the liquid crystal layer 3 are determined according to the intensity of the electric field. As described above, the luminance of light passing through the liquid crystal layer 3 varies according to the inclination directions of the liquid crystal molecules.

When a gate-on signal is applied to the gate line 121, the first thin film transistor Qa, the second thin film transistor Qb, and the third thin film transistor Qc are turned on. Accordingly, the data voltage applied to the data line 171 is applied to the first liquid crystal capacitor and the second liquid crystal capacitor through the first thin film transistor Qa and the second thin film transistor Qb, respectively. In this case, the first liquid crystal capacitor and the second liquid crystal capacitor are charged with the same voltage.

Simultaneously, the second thin film transistor Qb is connected with the third thin film transistor Qc, so that the second thin film transistor Qb is stepped down by the voltage applied to the step-down voltage line 123. Accordingly, the voltage of the step-down voltage line 123, to which the relatively low voltage is applied through the third thin film transistor Qc, is divided, so that the voltage charged in the second liquid crystal capacitor has a lower value than that of the voltage charged in the first liquid crystal capacitor.

Accordingly, the voltage charged in the first liquid crystal capacitor and the voltage charged in the second liquid crystal capacitor are different from each other, so that an angle of the inclination of the liquid crystal molecules in the first subpixel that is formed between the first subpixel electrode 191a and the common electrode 270 is different from an angle of the inclination of the liquid crystal molecules in the second subpixel that is formed between the second subpixel electrode 191b and the common electrode 270. Accordingly, luminance of the two subpixels are different.

Accordingly, when the voltage charged in the first liquid crystal capacitor and the voltage charged in the second liquid crystal capacitor are appropriately adjusted, an image viewed at a lateral side may become close to an image viewed at a front side, thereby improving side visibility.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the present disclosure.

<Description of symbols>

121: Gate line
123: Step-down voltage line
124a, 124b, 124c: First, second and third gate electrodes
151: Semiconductor layer
154a, 154b, 15c: First, second and third semiconductor layers
171: Data line
173a, 173b, 173c: First, second and third source electrodes
175a, 175b, 175c: First, second and third drain electrodes
191a, 191b: first and second Subpixel electrodes

| | |
|---|---|
| <Description of symbols> | |
| 193: Plate-shaped portion | 194: Branch electrode |
| 220: Light blocking member | 220a: Horizontal light blocking member |
| 220b: Vertical light blocking member | |
| 220c: Auxiliary light blocking member | |
| 225: Opening | 270: Common electrode |
| 271: Cross-shaped cutout | |

What is claimed is:

1. A liquid crystal display having a curved structure, comprising:
a plurality of pixels arranged in a matrix form; a first display substrate and a second display substrate that face each other; and a liquid crystal layer interposed between the first display substrate and the second display substrate,
wherein the first display substrate includes:
a first substrate;
gate lines disposed on the first substrate;
data lines intersecting with the gate lines;
a first subpixel electrode and a second subpixel electrode disposed in a pixel area;
a first thin film transistor connected to each of the gate lines and the data lines, and the first subpixel electrode; and
a second thin film transistor connected to each of the gate lines and the data lines, and the second subpixel electrode, and
wherein the second display substrate includes:
a second substrate facing the first substrate;
a light blocking member disposed on the second substrate; and
a common electrode disposed on the light blocking member,
wherein each pixel has a quadrangular shape including a long side extended in a first direction that is parallel to a direction in which the liquid crystal display is bent and a short side that is extended in a second direction that is vertical to the first direction to prevent an aperture ratio from being decreased in the liquid crystal display having the curved structure,
wherein the light blocking member includes a plurality of openings exposing a portion of the first subpixel electrode and the second subpixel electrode according to a plane,
wherein each opening has a quadrangular shape including a long side extended in the second direction and a short side extended in the first direction,
wherein the light blocking member includes:
a horizontal light blocking member overlapping the data line;
a vertical light blocking member overlapping the gate line, the first thin film transistor and the second thin film transistor; and
an auxiliary light blocking member parallel to the vertical light blocking member and connecting adjacent horizontal light blocking members,
wherein each opening is formed by the vertical light blocking member, the auxiliary light blocking member, and the horizontal light blocking member.

2. The liquid crystal display of claim 1, wherein the gate line is extended in the second direction and crosses a center portion of each pixel.

3. The liquid crystal display of claim 2, wherein the data line is extended in the first direction.

4. The liquid crystal display of claim 3, further comprising a step-down voltage line disposed on the first substrate, separated from the gate line, and extended in the second direction.

5. The liquid crystal display of claim 4, wherein a first voltage applied to the step-down voltage line is lower than a second voltage applied to the data line.

6. The liquid crystal display of claim 5, further comprising a third thin film transistor connected to the gate line, the step-down voltage line, and the second subpixel electrode.

7. The liquid crystal display of claim 6, wherein each of the first subpixel electrode and the second subpixel electrode includes a plate-shaped portion and a plurality of branch electrodes extended from the plate-shaped portion in four different directions.

8. The liquid crystal display of claim 7, wherein the common electrode includes a cross-shaped cutout overlapping the plate portion.

9. The liquid crystal display of claim 8, wherein each of the first subpixel electrode and the second subpixel electrode is divided into a plurality of subareas by the plate-shaped portion and the plurality of branch electrodes.

10. The liquid crystal display of claim 9, wherein the subarea of each of the first subpixel electrode and the second subpixel electrode is divided into four areas by the cutout and the plurality of branch electrodes on a plane.

11. The liquid crystal display of claim 10, wherein
the vertical light blocking member overlaps the third thin film transistor and the step-down voltage line.

12. The liquid crystal display of claim 11, wherein the auxiliary light blocking member overlaps a boundary portion of the plurality of subareas of the first subpixel electrode and the second subpixel electrode.

13. The liquid crystal display of claim 1, wherein the first subpixel electrode and the second subpixel electrode are disposed at a left side and a right side based on the gate line, respectively.

* * * * *